United States Patent
Romero Lopez

(10) Patent No.: US 12,004,521 B2
(45) Date of Patent: Jun. 11, 2024

(54) HYDROLYSIS METHOD FOR OBTAINING A HYDROLYSED DRY FOOD PRODUCT IN POWDER FORM

(71) Applicant: TECNIVET NUTRICION Y SERVICIOS VETERINARIOS, S.L., Madrid (ES)

(72) Inventor: Miguel Angel Romero Lopez, Madrid (ES)

(73) Assignee: TECNIVET NUTRICION Y SERVICIOS VETERINARIOS, S.L., Madrid (ES)

( * ) Notice: Subject to any disclaimer, the term of this patent is extended or adjusted under 35 U.S.C. 154(b) by 357 days.

(21) Appl. No.: 17/674,440

(22) Filed: Feb. 17, 2022

(65) Prior Publication Data
US 2022/0272991 A1 Sep. 1, 2022

(30) Foreign Application Priority Data
Feb. 26, 2021 (EP) .................................... 21159761

(51) Int. Cl.
*A21D 2/14* (2006.01)
*A23L 7/10* (2016.01)
*A23L 29/00* (2016.01)

(52) U.S. Cl.
CPC .............. *A21D 2/145* (2013.01); *A23L 7/198* (2016.08); *A23L 29/015* (2016.08)

(58) Field of Classification Search
None
See application file for complete search history.

(56) References Cited

U.S. PATENT DOCUMENTS

| 2,224,027 A | 12/1940 | Tate |
| 2,263,642 A | 11/1941 | Norton |
| 2,324,621 A | 7/1943 | Grady |
| 2,394,656 A | 2/1946 | Beregh |
| 5,698,724 A | 12/1997 | Anderson et al. |
| 2016/0157511 A1 | 6/2016 | Fillieres et al. |

FOREIGN PATENT DOCUMENTS

GB 1519164 A 7/1978
WO WO-2015014860 A2 * 2/2015 ................ A23J 1/10

OTHER PUBLICATIONS

M. Espe, et al., "Nutrient Absorption and Growth of Atlantic Salmon (*Salmo salar* L.) Fed Fish Protein Concentrate", Aquaculture, vol. 174, pp. 119-137, 1999.
Zhidong Song, et al., "Effects of Fismeal Replacement With Soy Protein Hydrolysates on Growth Performance, Blood Biochemistry, Gastrointestinal Digestion and Muscle Composition of Juvenile Starry Flounder (*Platichthys stellatus*)", Aquaculture, vol. 426-427, pp. 96-104, 2014.
F.X. Roth, et al., "Organic Acid as Feed Additives for Young Pigs: Nutritional and Gastrointestinal Effects", Journal of Animal and Feed Sciences, vol. 7, pp. 25-33, 1998.
Extended European Search Report corresponding to EP21159761, dated Jul. 14, 2021, (7 pages).

* cited by examiner

*Primary Examiner* — Jyoti Chawla
(74) *Attorney, Agent, or Firm* — Lucas & Mercanti, LLP

(57) ABSTRACT

A hydrolysis method for obtaining a hydrolysed dry food product in powder form by adding an acid solution to a material having a vegetable or animal origin for obtaining an acidified paste having a pH of less than 2.0; leaving the acidified paste to rest for the hydrolysis to take place; adding to the acidified paste obtained in the previous step a ground flour having a vegetable or animal origin having a granulometry such that, at least, 50% thereof has a size of less than 1 mm; adding an adsorbent excipient to the mix of acidified paste and ground vegetable/animal flour obtained in the previous step; and leaving the mix of acidified paste, ground vegetal/animal flour and adsorbent excipient to rest until the hydrolyzed dry food product in powder form is obtained.

14 Claims, No Drawings

HYDROLYSIS METHOD FOR OBTAINING A HYDROLYSED DRY FOOD PRODUCT IN POWDER FORM

CROSS-REFERENCE TO RELATED APPLICATION

This application claims the benefit of priority from European Patent Application Serial No. 21159761.2 filed on Feb. 26, 2021, which is incorporated herein by reference.

OBJECT OF THE INVENTION

The present invention belongs to the field of the food industry, and more particularly to the obtention of hydrolysed dry food products in powder form.

The object of the present invention is a new hydrolysis method which does not require the application of heat or of enzymes for obtaining a hydrolysed dry food product in powder form.

PRIOR ART

The hydrolysis method mainly consists of adding an acid or one or more types of enzymes to a food product for breaking the protein or hydrocarbon chains of said food product. The hydrolysed food product obtained as a result of this method is more readily digestible, and it further has a longer shelf life. Hydrolysed products can be added to food products for enhancing their digestibility and for increasing the appetite.

For example, in the specific case of proteins, the intestines of animals must reduce their size until obtaining complexes formed by 1-3 amino acids in order for them to be suitably absorbed. That is, since the molecular size of amino acids ranges between 80 and 200 Daltons (Da), the intestines of animals are capable of absorbing amino acid complexes having a size of up to 800 Da. However, naturally occurring proteins are large molecular complexes formed by between 150-300 amino acids, their usual total size being larger than 35000 Da. Furthermore, obtaining a hydrolysed product having a low pH, for example under 4.0, allows for inhibiting microorganism growth and, therefore, for delaying putrefaction.

Current hydrolysis methods result in a wet hydrolysed product in liquid or paste form. Thereafter, this wet hydrolysed product can be dried for obtaining a hydrolysed product in powder form.

A first drying method consists of the application of heat to the wet hydrolysed product. However, the application of heat is disadvantageous in that degradation of proteins takes place; undigestible complexes are formed by Maillard reactions, which generate undigestible associations between amino acids and carbohydrates impeding the intestines from absorbing the former.

Alternatively, the wet hydrolysed product can be dried by adding an adsorbent excipient. However, this method is disadvantageous in that ingredients having no nutritional value are added to the formulation of the hydrolysed product. Indeed, the quantity of excipient added to the wet hydrolysed product can range, as a percentage of the adsorbed aqueous part, between 35% in the case of silicon dioxide and 77% in the case of sepiolite. The consequences from a nutritional point of view are evident, since the inert excipient does not provide any nutritional value to the formulation of the product. Therefore, the nutrients of the food are diluted, the costs increase and, further, in case of using sepiolite for the adsorption, the content in acid insoluble ashes in the obtained dry hydrolysed product increase. In this context, it is important to note that the current legislation, specifically the European Additive Register, limits the acid insoluble ashes in animal food to a maximum of 2%.

Documents U.S. Pat. Nos. 2,224,027 and 5,698,724 disclose methods using between 20-50% of soy protein concentrate with 65% of raw protein and 80% of isolated soy protein having 90% of raw protein with the final object of producing metal-amino acid complexes. With any of the raw material source employed, the level of raw protein is always equal or greater than 65%. AS disclosed in document U.S. Pat. No. 2,224,027, there is a limitation in that the concentrate having 65% of raw protein cannot be more than 50%, since the quantity of carbohydrates would be problematic. Furthermore, this invention disclosed the application of heat at 100-150° C. during 1 to 12 hours.

Document U.S. Pat. No. 2,263,642 discloses the use of peeled soy seeds macerated in water and thereafter incubated, going through an enzymatic hydrolysis method (from enzymes existing in the soy seeds or added thereto), by applying temperatures of between 25° C. and 90° C. for 4-12 hours. Enzymes having a pH of between 6.0 and 8.0 for the hydrolysis of the polysaccharides.

The object of document U.S. Pat. No. 2,324,621 is preparing a soy drink; this requires an initial phase at a pH of about 4.0 to 5.0 and a pH final adjustment of between 4.0 and 6.0. To be completely finished, the drink requires a pasteurization process (a temperature of at least 82.2° C. is applied for at least 10 seconds).

The object of document U.S. Pat. No. 2,394,656 is the production of a soy drink; intact full soy is used as a raw material, which is thereafter peeled. Then, heat (85° C.) is applied for 10 minutes and finally the pH is adjusted between 7.0 and 8.0.

SUMMARY OF THE INVENTION

The present invention discloses a hydrolysis method for producing a dry hydrolysed food product in powder form without the need to apply heat and where the hydrolysis does not take place through endogen or exogen enzymes, but it takes place thanks to a sufficiently low pH that breaks up the protein. The present invention is also directed to the product of said method.

DETAILED DESCRIPTION OF THE INVENTION

A first aspect of the present invention discloses a hydrolysation method for obtaining a hydrolysed dry food product in powder form comprising mainly the following steps:
1. Adding an acid solution to a material having a vegetable or animal origin for obtaining an acidified paste having a pH below 2.0.

The initial material for this method can be a material having a vegetable origin or a material having an animal origin. The granulometry of this initial material is normally substantially larger than that of the material added in a second phase of the method of the invention disclosed further below in the present document. Normally, this material is essentially dry, for example in the form of a vegetable or animal flour.

In case of using a flour having a vegetable origin, soy flour, *quinoa* flour, pea flour, sunflower flour, colza flour or any mix thereof can be employed. In a particular example, soy flaked flour of the type usually employed for making animal food products. According to the European Catalogue of Raw Materials, soy flour is understood to be the "product from the oil extracting industry, obtained by extraction and after a suitable thermal treatment from soybeans". The quantity of raw protein in this type of soy flour can be between approximately 44% and 48%.

Alternatively, a meat or fish ensilage can be employed. In this context, the term "ensilage" refers to a paste or flour generated by grinding meat or fish, to which a number of different types of acids having a certain aqueous content are added for breaking up, hydrolysing, and preserving the cited meat or fish. The pH usually employed in these ensilages ranges between 3.5 and 4.0. Preferably, to facilitate the obtention of an acidified paste having a pH below 2.0, when a meat or fish ensilage is used as the initial material for this method, its pH must be below 4.0.

According to the method of the invention, the necessary quantity of acid solution is added to this initial vegetable/animal material for the resulting acidified paste to have a pH below 2.0. This acidity level ensures the start of the hydrolysis process of the animal/vegetable flour added at the end of the process, that is, the breaking up of the protein or hydrocarbon chains of the initial material without the need to add enzymes, whether endogen or exogen.

Generally speaking, the acid solution will have the lowest possible pH, preferably below 1.0, since thereby the quantity of acid solution needed for the acidified paste to have a pH below 2.0 is reduced. This is relevant because, the lowest the quantity of acid added, the lowest the humidity level in the acidified paste, and therefore the easier a hydrolysed dry food product will be obtained. Further, the use of an acid solution having such a low pH causes the resulting hydrolysed dry food product in powder form also to have a low pH, which is advantageous for the reasons explained further down in the present document.

According to particularly preferred embodiments of the invention, the acid solution is obtained from at least one of the following organic acids and/or their salts: formic acid, propionic acid, acetic acid, lactic acid, butyric acid, lignosulfonic acid, capric acid, caproic acid, caprylic acid, humic acid, citric acid, valeric acid, enaltilic acid, elargonic acid, lauric acid, myristic acid, palmitic acid, margaric acid, stearic acid, sorbic acid, malic acid or benzoic acid, and/or from at least one of the following inorganic acids and/or their salts: phosphoric acid, hydrochloric acid, sulfuric acid, or nitric acid.

2. Letting the acidified paste rest for the hydrolysis to take place

The rest time needed can be variable depending on several characteristics of the obtained acidified paste, such as the particular pH level, the type of starting vegetable/animal material, etc.

3. Adding, to the acidified paste obtained in the previous step, a ground flour having a vegetable or animal origin having a granulometry such that at least 50% thereof has a particle size below 1.0 mm.

In this step, in principle any kind of vegetable/animal flour can be employed as long as it is sufficiently ground, such as for example soy flour, *quinoa* flour, pea flour, sunflower flour, colza flour, meat flour and/or fish flour.

As to the quantity, according to a particularly preferred embodiment of the invention, the quantity of ground vegetable/animal flour added is essentially equal to the quantity of the initial vegetable/animal material to which the acid solution was added.

Normally, the ground vegetable/animal flour is added slowly during between 5 minutes and 10 minutes. Thereafter, or at the same time, the ground flour is mixed thoroughly with the acidified paste to obtain a uniform mix.

The inventors of the present application have found that the hydrolysis process of the initial vegetable/animal material does not stop with the addition of the ground vegetable/animal flour as long as at least 50% of said ground flour has a particle size below 1.0 mm, or more preferably at least 75% of the ground flour has a particle size below 1.0 mm, or even more preferably at least 90% of said ground flour has a particle size below 1.0 mm. The reason for this is believed to be the presence of acid remaining in the acidified paste that acts during the second phase. The action of this acid excess in the acidified paste is facilitated due to the great contact surface of the finely ground vegetable/animal flour particles according to the disclosed granulometry. Thereby, the total quantity of food substance (initial vegetable/animal material plus ground vegetal/animal flour) treated without the need to increase the quantity of acid solution needed is maximized. Thus, the quantity of adsorbent excipient needed to dry the mix is reduced, and therefore the content of proteins in the hydrolysed dry food product is greatly increased.

In other words, if the initial vegetable/animal material plus the ground vegetable/animal flour were mixed with the acid solution from the beginning, the greater quantity of acid solution required for the hydrolysis to begin in the resulting paste would be greater than when employing the method of the invention where they are added in two separate steps. That is, the quantity of acid solution added in the method of the invention, where only the vegetable/animal material is initially present, would not be enough. Since the quantity of acid solution added would be greater, the quantity of adsorbent excipient needed to dry said paste would also be greater and, therefore, the protein content in the final product would be much lower than that obtained by means of the method of the present invention.

4. Adding an adsorbent excipient to the mix of acidified paste and ground vegetable/animal flour obtained in the previous step for neutralizing the remaining humidity excess.

The addition of the excipient can also include a simultaneous or subsequent mixing for obtaining a more uniform result. Since the hydrolysis process is continuous during the whole method, that is, it does not stop when the ground vegetable/animal flour is added, the quantity of excipient needed is greatly reduced with respect to the methods usually used in the field.

Specifically, the inventors of the present application have found that the maximum quantity of excipient that needs to be added in this step is les than 8% of the total of the finished product. That is, in 1000 g of hydrolysed dry food product in powder form, the maximum quantity of excipient added would be of 80 g.

In principle, any type of excipient used normally in the field can be employed, such as for example silicon dioxide, sepiolite, kaolinite, or montmerolite.

5. Letting the mix of acidified paste, ground vegetable/animal flour and adsorbent excipient rest until the hydrolysed dry food product in powder form is obtained.

The rest time needed can be variable depending on several characteristics of the mix of acidified paste, ground vegetable/animal flour and adsorbent excipient, such as the particular pH level, the type of initial vegetable/animal material, etc.

This new method is advantageous in that the quantity of adsorbent excipient needed for obtaining the hydrolysed dry food product in powder form is much lower in comparison with the methods currently known. This is very advantageous because the quantity of materials lacking nutritional attributes in the hydrolysed food product is greatly reduced.

Indeed, in a test carried out by the inventors of the present application, when the acid solution was applied to soy flour, a paste having a high acidity level was formed that would have needed the application of heat or the application of large quantities of adsorbent excipient. Drying by applying heat does not only deteriorate the final product, but the production is also more complicated because the process generates highly corrosive vapours. As to the addition of an adsorbent, drying the paste would require approximately 0.53 times silicon dioxide for each part of adsorbed liquid, or else approximately 3.26 times sepiolite for each part of adsorbed liquid.

However, using the method of the invention where, in a second phase, finely ground soy flour was added, a hydrolysed dry product in dry form was obtained without the need to apply heat and with only a maximum of 0.16 parts of silicon dioxide for each part of adsorbed liquid. Therefore, in order to adsorb about 500 g of liquid in a total of the 1000 g of the finished product, only a maximum of 80 g of excipient are needed.

In this context, the term "adsorbed liquid" refers to the total humidity content in the mix of the acidified paste and the ground vegetable/animal flour. This humidity comes from the acid solution added at the beginning plus the possible content in water and/or acid in the initial vegetable/animal material (in this case, soy flour) and in the ground vegetable/animal flour (in this case, also ground soy flour).

Further, since the method of the invention does not require the application of heat or enzymes and given that the quantity of inert excipient is less than 8%, this method allows for a great reduction in cost in the production system. For example, the cost of a spray tower for drying the wet product by applying heat ranges between 300000 to 1000000 €, while production systems having a cost of between 20000 to 100000 € can be employed with the method of the invention.

Additionally, probably due to the high acidity level in the acid solution added in the initial step of the present method, the resulting hydrolysed dry food product in powder form has a high acidity level, normally less than 3.0. This low pH is advantageous for the reasons disclosed further down in the present document.

Product Obtained by the Method of the Invention

A second aspect of the present invention is directed to a hydrolysed dry food product in powder formed obtained by means of the method disclosed above. Preferably, said food product has a maximum content in proteins of more than 800 Da lower than 30%, with a maximum quantity of 0.16 parts of silicon dioxide for each part of adsorbed liquid.

Indeed, the method of the present invention guarantees the size reduction of the protein. To verify this, the inventors of the present invention employed UltraViolet High Performance Liquid Chromatography (HPLC-UV) to determine the distribution of molecular weights in samples of dry hydrolysed products obtained from different initial substances including proteins, peptides, and free amino acids. The analysis of each dry hydrolysed sampled included placing the sample in a solution and carrying out the analysis to the soluble part. This soluble part was injected by means of the HPLC technique and, thereafter, a UV detection having a wavelength of 214 nanometres was carried out.

Said analysis showed that the method of the invention allows for obtaining a final hydrolysed product where the fraction of protein having more than 35000 Da is less than 2% of the protein total. That is, when soy flour is employed in the initial phase and also ground soy flour is used also in the second phase, the percentage of complexes having a size greater than 35000 Da in the finished product is at least 30 times smaller than in the initial substance. Specifically, the fraction of protein having a size of more than 35000 Da in the initial soy flour is larger than 60%, while in the dry hydrolysed product obtained by means of the method of the invention the fraction of protein having a size of more than 35000 Da is just 1.29%. On the contrary, the method of the invention increased the fraction of protein having a size of less than 800 Da more than 3 times (the initial soy flour had approximately 25%, while the hydrolysed product had more than 80%).

The complete data obtained in this test are shown by means of a table presented further down in the present document with reference to a first example of the method of the invention.

Competitive Advantages Over the State of the Art

All hydrolysed products having an animal or vegetable origin are intended for providing proteins, in a more or less fractioned form; they are in liquid form or, when solid, expensive spray drying towers that partly degrade the protein due to the high temperatures need to be employed. The method of the invention allows for obtaining a hydrolysed product in solid form by applying less than 8% of adsorbent in the total weight of the finished product and without applying heat. This is possible thanks to the addition of a number of raw materials having different granulometries in a particular order. Therefore, solid vegetable/animal origin hydrolysed products can be added to finished animal feeds, to additive pre-mixes for animal feed or to compound complementary feed.

Dispensing with the need to use spray systems in the mixer of the plant where they will be employed.

Without losing nutritional value due to a drying process based on the application of heat.

Using less than 16% of excipient in proportion to the liquid part (less than 8% of the total finished product).

Without adding enzymes.

Without carrying out neutralizations during the process.

In short, the hydrolysed dry food product obtained by means of the method of the invention has a larger protein content than similar food products obtained by means of conventional methods. This is advantageous for the following reasons:

1. The appetite of the animals for food containing the food product obtained by means of the method of the invention is increased. Indeed, the presence of low molecular size peptides favours the production of hormone ghrelin, discovered in 1999 by Dr. Masayasu Kojima. This hormone, in turn, stimulates the appetite and causes growth hormone to the segregated by the animals (up to 2 to 3 times more according to Ghico, *"More than a natural GH secretagogue and/or anorexigenic factor 2005"*; 62:1-17).

2. The digestibility of the protein is exogenously increased, favouring the digestion process. The digestion of proteins takes place in the stomach in a first phase (thanks to the pepsin) and in the small intestine in a second phase (trypsin and chymotrypsin), for generating smaller size complexes which can be absorbed as individual amino acids or else as complexes of 2 or maximum 3 amino acids. For this reason, providing pre-digested amino acids will favour the digestion of the protein (see Shubert, Mitchell L, *"Functional anatomy and physiology of gastric secretion, Current Opinion"* in Gastroenterology: November 2015—Volume 31—Issue 6—p 479-485 o Koeltz, H. R. 1992. *"Gastric acid in vertebrates"*. Scand. J. Gastroenterol., 193: 2-6).

3. Economic savings in feed having the food product obtained by the method of the invention, since said product still has part of the non-neutralized acids used in the hydrolysis process; these acids increase the efficiency and digestive security of the feed where the product is included. Therefore, these feed do not require the addition of organic acids, thus being cheaper. Indeed, presumably because of the high acidity of the acid solution employed in the present method, the pH of the finished product is below 3.0. This high acidity level is responsible for:

a. Favouring the digestion of the proteins contained in the feed because of the high amount of acids in the hydrolysed product. The application of acids to the feed increases the productive efficiency thereof and also favour a better intestinal comfort, reducing digestive pathologies in the farms (see Roth, F. X., Kirchgessner, M., 1998. *"Organic acids as feed additives for young pigs: nutritional and gastrointestinal effects"*. J. Anim. Feed Sci. 7 (Suppl. 1), 25-33).

b. Improving the sterilization of the feed having the finished product according to the invention. The European norm related to animal feed, Regulation CE 183/2005 establishes the use of systems allowing for reducing the contamination in the feed, such as e.g. by using acids. On the other hand, acids are used in most countries worldwide for sterilizing animal feed.

c. Reducing the amount of pathogens passing to the small intestines due to a better sterilization of the gastric bolus, as shown in *"Prueba comparativa de ácidos y acidificantes orgánicos en un modelo de estómago de lechón"*. Romero López, Virsoe et al, Anaporc 1999, Talavera de la Reina (España).

PREFERRED EMBODIMENT OF THE INVENTION

In the following, some examples of methods according to the invention are disclosed. In both examples, the method takes place at room temperature.

Example 1: Obtaining a Hydrolysed Product from Soy Flour

1. Obtaining the acid solution
   Distilled water is mixed with the necessary amount of an acidifier comprising formic acid and lignosulfonic acid until a pH of less than 1.0 is reached. The mix takes place slowly for about 5 minutes.

2. Mixing the acid solution with the soy flour
   Between 40 and 50 litres of the acid solution obtained in the previous step are added to about 25 Kg of soy flour until an acidified paste having a pH of less than 2.0 is obtained. The mix tales place slowly for about 10 minutes.

3. Rest time
   The acidified paste obtained in the previous step is left to rest for 24 hours.

4. Adding ground soy flour having a granulometry whose particle size is less than 1 mm in at least 75% of its composition.
   Next, about 25 Kg of ground soy flour having the granulometry disclosed above are added to the acidified paste obtained in the previous step, and the result is mixed for about 10 minutes.
   As disclosed above in the present document, the inventors of the present application found that the hydrolysis process does not stop with the addition of the ground soy. This fact can also be derived from the following table showing the protein content segmented by size respectively in the initial soy flour, in the acidified paste formed after mixing the acid solution with the initial soy flour, and in the hydrolysed finished product obtained by this method.
   Indeed, the table shows that the protein fraction of less than 800 Da is similar in the acidified paste (91.05%) and in the finished hydrolysed product (83.88%), which clearly indicates that the hydrolysis has continued after adding the ground soy flour. Otherwise, since 25 Kg of ground soy flour are added to the initial 25 Kg of soy flour, said protein fraction would be greatly reduced.
   Similarly, the table shows that the initial soy flour has a protein level of more than 35000 Da larger than 60%. In the acidified soy paste, the amount of protein having a size of more than 35000 Da is less than 2%. When adding the finely ground soy flour, this value remains in less than 2%.

| MOLECULAR SIZE (expressed in daltons (d) | UNGROUND SOY FLOUR | ACID PASTE | FINAL PRODUCT |
| --- | --- | --- | --- |
| PM > 35 000 | 53.13 | 1.47 | 1.29 |
| 35 000 > PM > 32 000 | 0.65 | 0.00 | 0.10 |
| 32 000 > PM > 28 000 | 0.94 | 0.00 | 0.22 |
| 28 000 > PM > 24 000 | 0.97 | 0.00 | 0.31 |
| 24 000 > PM > 20 000 | 0.67 | 0.00 | 0.30 |
| 20 000 > PM > 18 000 | 0.31 | 0.00 | 0.17 |
| 18 000 > PM > 16 000 | 0.37 | 0.00 | 0.25 |
| 16 000 > PM > 14 000 | 0.40 | 0.00 | 0.30 |

| MOLECULAR SIZE (expressed in daltons (d)) | UNGROUND SOY FLOUR | | ACID PASTE | | FINAL PRODUCT | |
| --- | --- | --- | --- | --- | --- | --- |
| 14 000 > PM > 12 000 | 0.46 | | 0.00 | | 0.35 | |
| 12 000 > PM > 10 000 | 0.56 | | 0.00 | | 0.51 | |
| 10 000 > PM > 9 000 | 0.30 | | 0.01 | | 0.34 | |
| 9 000 > PM > 8 000 | 0.28 | | 0.03 | | 0.38 | |
| 8 000 > PM > 7 000 | 0.25 | | 0.07 | | 0.44 | |
| 7 000 > PM > 6 000 | 0.25 | | 0.09 | | 0.49 | |
| 6 000 > PM > 5 000 | 0.25 | | 0.12 | | 0.52 | |
| 5 000 > PM > 4 000 | 0.34 | | 0.22 | | 0.74 | |
| 4 000 > PM > 3 500 | 0.26 | | 0.22 | | 0.58 | |
| 3 500 > PM > 3 000 | 0.33 | | 0.30 | | 0.71 | |
| 3 000 > PM > 2 500 | 0.26 | | 0.30 | | 0.63 | |
| 2 500 > PM > 2 000 | 0.28 | | 0.38 | | 0.58 | |
| 2 000 > PM > 1 800 | 0.18 | | 0.23 | | 0.36 | |
| 1 800 > PM > 1 600 | 0.21 | | 0.30 | | 0.43 | |
| 1 600 > PM > 1 400 | 0.34 | | 0.56 | | 0.78 | |
| 1 400 > PM > 1 200 | 0.80 | | 1.32 | | 1.65 | |
| 1 200 > PM > 1 000 | 0.80 | | 1.45 | | 1.50 | |
| 1 000 > PM > 900 | 0.35 | | 0.76 | | 0.78 | |
| 900 > PM > 800 | 0.56 | SIZE <800 d | 1.12 | SIZE <800 d | 1.20 | SIZE <800 d |
| 800 > PM > 700 | 1.02 | 25.50 | 1.76 | 91.05 | 1.94 | 83.88 |
| 700 > PM > 600 | 1.39 | | 3.26 | | 2.98 | |
| 600 > PM > 500 | 1.94 | | 5.09 | | 4.41 | |
| 500 > PM > 400 | 3.04 | | 6.58 | | 6.72 | |
| 400 > PM > 300 | 3.67 | | 13.40 | | 15.25 | |
| 300 > PM > 204 | 10.16 | | 33.85 | | 30.97 | |
| 204 > PM | 4.28 | | 27.11 | | 21.61 | |
| Total | 100.00 | | 100.00 | | 100.00 | |

5. Adding the adsorbent excipient

Finally, the necessary amount of silicon dioxide for drying the mix of acidified paste and ground soy flour is added. Thanks to the drying effect obtained by the addition of the ground soy flour of the previous step, only an amount of less than 8% of silicon dioxide is necessary for drying the remaining liquid.

6. Bagging

In a final step of the present method, the mix of acidified paste, ground soy flour and silicon dioxide is bagged. Before commercialization, the product is left to rest for 24 hours.

Example 2: Obtaining a Hydrolysed Product from Fish or Meat Feed

1. Obtaining the acid solution

Distilled water is mixed with the necessary amount of organic acid (formic acid and/or lignosulfonic acid) until a pH of less than 1.0 is reached. The mix takes place slowly for about 5 minutes.

2. Mixing the acid solution with the meat or fish feed

Between 30 and 40 litres of the acid solution disclosed above are added to about 25 Kg of dry meat or fish feed; an acidified paste having a pH of less than 2.0 is obtained. As disclosed, the amount of acid solution needed for the acidified paste to reach a pH of less than 2.0 is less than in the previous example because the usual pH in this type of animal feed is between 3.0 and 4.0. Thereafter, the acidified paste is mixed slowly for about 10 minutes.

3. Rest time

The acidified mix obtained in the previous step is left to rest for 24 hours.

4. Adding ground soy flour having a granulometry where 80% of the particles is smaller than 1 mm.

Then, about 25 Kg of ground soy flour having the granulometry disclosed above are added to the acidified paste obtained in the previous step, and the result is mixed for about 10 minutes.

5. Adding the adsorbent excipient

Finally, less than 8% of silicon dioxide is added for drying the remaining liquid.

6. Bagging

In the last step, the mix of acidified paste, ground soy flour and silicon dioxide is bagged. Before commercialization, the product is left to rest for 24 hours.

The invention claimed is:

1. A Hydrolysis method for obtaining a hydrolyzed dry food product in powder form, comprising:
adding an acid solution to a material having a vegetable or animal origin to obtain an acidified paste having a pH of less than 2.0;
leaving the acidified paste to rest for hydrolysis to take place;
adding, to the acidified paste obtained in the previous step, a ground flour having a vegetable or animal origin having a granulometry such that, at least, 50% thereof has a size of less than 1 mm;
adding an adsorbent excipient to the mix of acidified paste and ground vegetable/animal flour obtained in the previous step; and
leaving the mix of acidified paste, ground vegetal/animal flour and adsorbent excipient to rest until the hydrolyzed dry food product in powder form is obtained.

2. The hydrolysis method according to claim 1, wherein the material having a vegetable origin is soy flour, *quinoa* flour, pea flour, sunflower flour, colza flour or any mix thereof.

3. The hydrolysis method according to claim 1, wherein the material having an animal origin is a meat or fish animal feed.

4. The hydrolysis method according to claim 3, wherein the meat or fish animal feed has a pH of less than 4.0.

5. The hydrolysis method according to claim 1, wherein the acid solution is at least one of the following organic acids and/or their salts: formic acid, propionic acid, acetic acid, lactic acid, butyric acid, lignosulfonic acid, capric acid, caproic acid, caprylic acid, humic acid, citric acid, valeric acid, enaltilic acid, elargonic acid, lauric acid, myristic acid, palmitic acid, margaric acid, stearic acid, sorbic acid, malic acid, or benzoic acid; and/or at least one of the following inorganic acids and/or their salts: phosphoric acid, hydrochloric acid, sulfuric acid, or nitric acid.

6. The hydrolysis method according to claim 5, wherein the acid solution has a pH of less than 1.0.

7. The hydrolysis method according to claim 1, wherein the ground flour having a vegetable or animal origin is soy flour, *quinoa* flour, pea flour, sunflower flour, colza flour, meat flour or fish flour.

8. The hydrolysis method according to claim 1, wherein the ground flour having a vegetable or animal origin has a granulometry such that, at least, 75% thereof has a size of less than 1 mm.

9. The hydrolysis method according to claim 1, where the ground flour having a vegetable or animal origin has a granulometry such that, at least, 90% thereof has a size of less than 1 mm.

10. The hydrolysis method according to claim 1, wherein the step of adding the ground flour having a vegetable or animal origin comprises adding an amount of ground flour having a vegetable or animal origin essentially equal to the amount of initial material having a vegetable or animal origin to which the acid solution is added.

11. The hydrolysis method according to claim 1, further comprising adding to the mix of acidified paste and ground flour having a vegetable or animal origin a maximum amount of excipient of less than 8%.

12. The hydrolysis method according to claim 1, wherein the excipient is silicon dioxide, sepiolite, kaolinite or montmerolite.

13. A hydrolyzed dry food product in powder form obtained by the method according to claim 1.

14. The hydrolyzed dry food product in powder form according to claim 13, having a maximum content in proteins of more than 800 Da of less than 30% with a maximum content of 0.16 parts of silicon dioxide for each part of absorbed liquid.

* * * * *